United States Patent
Baratta

(10) Patent No.: US 10,118,857 B2
(45) Date of Patent: Nov. 6, 2018

(54) METHOD FOR INTERNALLY COATING A HOLLOW GLASS BODY

(71) Applicant: BORMIOLI LUIGI S.p.A., Parma (IT)

(72) Inventor: Simone Baratta, Parma (IT)

(73) Assignee: BORMIOLI LUIGI S.p.A., Parma (IT)

(*) Notice: Subject to any disclaimer, the term of this patent is extended or adjusted under 35 U.S.C. 154(b) by 107 days.

(21) Appl. No.: 14/758,726

(22) PCT Filed: Jan. 29, 2014

(86) PCT No.: PCT/IB2014/058631
§ 371 (c)(1),
(2) Date: Jun. 30, 2015

(87) PCT Pub. No.: WO2014/118708
PCT Pub. Date: Aug. 7, 2014

(65) Prior Publication Data
US 2015/0353416 A1    Dec. 10, 2015

(30) Foreign Application Priority Data

Jan. 29, 2013 (IT) .............................. MI2013A0125

(51) Int. Cl.
| | | |
|---|---|---|
| *B05D 7/22* | (2006.01) | |
| *C03C 17/00* | (2006.01) | |
| *C03C 17/04* | (2006.01) | |
| *B05D 1/02* | (2006.01) | |

(52) U.S. Cl.
CPC .............. *C03C 17/004* (2013.01); *B05D 7/22* (2013.01); *B05D 7/227* (2013.01); *C03C 17/04* (2013.01); *B05D 1/02* (2013.01)

(58) Field of Classification Search
CPC ......... C03C 17/004; C03C 17/04; B05D 1/02; B05D 7/22; B05D 7/227; B05D 3/0254
USPC ................. 427/233, 231, 230, 236
See application file for complete search history.

(56) References Cited

U.S. PATENT DOCUMENTS

| | | | |
|---|---|---|---|
| 2,740,726 A | | 4/1956 | Anderson |
| 3,372,053 A | | 3/1968 | McCarthy |
| 4,606,942 A | * | 8/1986 | Shriver .............. B05B 13/0609 118/317 |
| 6,105,394 A | | 8/2000 | Sridharan et al. |
| 2002/0076501 A1 | * | 6/2002 | Costantini ............. B29C 33/58 427/133 |
| 2004/0112274 A1 | | 6/2004 | Tsujimoto et al. |
| 2006/0099360 A1 | | 5/2006 | Farha |
| 2008/0011778 A1 | | 1/2008 | Ronsi et al. |
| 2008/0078207 A1 | | 4/2008 | Tsujimoto et al. |
| 2009/0311452 A1 | * | 12/2009 | Gourde ................. A45D 34/02 428/34.6 |
| 2010/0192841 A1 | * | 8/2010 | Tsujimoto ............ C03C 17/004 117/208 |
| 2012/0082788 A1 | * | 4/2012 | Bauvin ................ B05B 12/124 427/233 |

FOREIGN PATENT DOCUMENTS

| | | |
|---|---|---|
| EP | 1 408 015 A2 | 4/2004 |
| EP | 1 599 295 B1 | 8/2007 |
| EP | 2 135 523 | 12/2009 |
| FR | 2 889 485 A1 | 2/2007 |

OTHER PUBLICATIONS

International Search Report and Written Opinion dated May 15, 2014 in PCT/IB2014/058631 filed May 15, 2014.
Third Party Observation for application No. EP20140714328.

* cited by examiner

*Primary Examiner* — Kirsten Jolley
(74) *Attorney, Agent, or Firm* — Oblon, McClelland, Maier & Neustadt, L.L.P.

(57) ABSTRACT

The present invention regards a method for internally coating a hollow glass body comprising the steps of: (a) applying on at least one internal surface of said hollow body at least one coating composition in form of liquid dispersion comprising at least one glass frit and at least one polymeric dispersing agent; (b) subjecting said internal surface comprising said coating composition to a thermal treatment, so as to obtain a vitrified coating layer.

22 Claims, No Drawings

METHOD FOR INTERNALLY COATING A HOLLOW GLASS BODY

The present invention regards a method for internally coating a hollow glass body, such as for example a bottle, a container or a glass.

The present invention applies to the field of production of glass articles, in particular containers, comprising surface coatings for decorative or functional purposes.

In the field of production of consumption goods intended to be packaged in glass containers, such as for example, cosmetic products, perfume products or food products, there arises the need of having containers characterised by an aesthetic aspect capable of capturing the consumers' attention. Actually, the aesthetic aspect of a container may have considerable impact on the purchase options of the product consumer.

An analogous need arises in the tableware industry, i.e. the industry of glass objects generally for domestic use such as containers for preserving foods, wine decantation containers (so-called, "decanters"), vases, decorative objects etc.

In the prior art there are known various methods for decorating the internal surface of a glass container or container made of any other transparent or translucent material (e.g. thermoplastic resin), which however reveal various drawbacks.

In case of containers for food, cosmetic or perfume products, the decorative coating applied in the internal cavity of the container is intended to remain at contact with the product even for extremely long periods of time. Thus, it should be made using materials having characteristics such that: (i) the coating does not release substances that can migrate into the product, thus altering the quality thereof, making it hazardous for the user in the worst case; (ii) the coating remains unaltered even following long contact with chemically aggressive substances, such as for example alcoholic compounds contained in perfumes or in alcoholic drinks (e.g. whisky, grappa, etc.); (iii) the coating prevents the migration of substances coming from the material which forms the container into the product.

In addition, in the case of glass containers for food products and tableware objects, the internal coating should also be capable of resisting to contact with products at high temperatures (e.g. hot beverages) and repeated washings with alkaline agents (possibly using abrasive instruments such as for example brushes and sponges), as well as the abrasive action that could be exerted by scrubbing kitchen instruments such as cutlery, ladles etc.

The methods for internal decoration of glass containers and, more generally, hollow glass bodies, known in the state of the art are based on the application of coating compositions in liquid or solid phase by spraying.

EP 1599295 A1, for example, describes a method for the internal decoration of bottles made of glass or thermoplastic material, in particular for perfumes, in which a liquid or powder coating composition is sprayed into the cavity of the bottle through a spraying nozzle. The coating composition is based on epoxy, polyurethane, acrylic, polyethylene and polyester resins. However, due to the chemical composition of these resins, the applied coating does not have the suitable resistance to prolonged contact with the alcohol substances typically present in the perfumes. In addition, when the coating is applied by spraying the resin in form of powder, there also arises the need of using a suctioning device for extracting the surplus sprayed composition from the container. This solution solely allows the application of uniform and continuous coatings over the entire internal surface of the bottle, but it prevents the application of the coating on a limited portion of the internal surface or creating shaded decorative patterns or irregularly shaped patterns.

In addition, coatings obtained starting from powder compositions have a limited degree of adhesion to the glass. The poor adhesion of the coating facilitates the formation of interspaces between the latter and the walls of the container, in which there may accumulate moisture, thus increasing the risk of altering or contaminating the product contained therein and an aesthetic damage due to the interaction of the glass with the water which causes the surfacing of soda. Such events may require the adoption of preventive measures, such as the use of special paper bags for holding the packaged product, which are positioned within the container, obtained using a material suitable to guarantee prolonged and safe contact therewith (see for example US 2008/0011778) or preventive processes for the making the surface of the glass inert.

Even EP 2135523 A1 describes a method for the internal decoration of glass or plastic bottles, in particular perfume bottles, in which a liquid coating composition is sprayed into the cavity of the bottle through a spraying nozzle. In this case, the applied coating is constituted by an inorganic polymer with silicone matrix (i.e., a material similar to synthetic glass) obtained through a sol-gel process. Besides having a decorative function, such coating is at direct contact with the product, towards which it serves the function of a barrier with respect to the migration of unwanted substances coming from the container or any underlying layers of coating. The method described in this patent application is not easy to apply at industrial level and it requires quite long implementation periods. The formation of the coating through a sol-gel process actually requires an accurate control of the process conditions both when forming the mineral gel and in the subsequent step of polycondensation. In addition, the coatings obtained using the inorganic polymers described in EP 2135523 A1 are poorly resistant to abrasion, due to the presence of pigments within the polymer cross-link which destabilizes the structure thereof.

FR 2889485 A1 describes a method for the internal decoration of bottles made of glass or thermoplastic material, in particular perfume bottles, in which a liquid or powder lacquer is sprayed into the cavity of the bottle through a spraying nozzle. During or after the spraying of the lacquer, the bottle may be subjected to a magnetic field, so as to obtain a more uniform decoration over the entire internal surface of the container. After the application of the coating, the container is subjected to a thermal treatment for heating the lacquer. The coating described in this document is indicated as compatible with the prolonged contact with cosmetic or perfume products. However, FR 2889485 A1 does not provide any information regarding the chemical composition of the lacquer used.

An object of the present invention is to overcome the drawbacks outlined in the state of the art.

In particular, a specific object of the present invention is to provide a method for internally coating a hollow glass body with a coating having an improved resistance to aggression by chemical substances, even hot ones, and an improved resistance to abrasion.

A further object of the present invention is to provide a method for internally coating a hollow glass body capable of allowing obtaining a wide variety of decorative patterns.

A further object of the present invention is to provide a method for internally coating a hollow glass body that is easy to manufacture and applicable in the production of glass articles intended for various fields of use.

An object of the present invention is to provide a method for internally coating a hollow glass body comprising the steps of:

(a) applying on at least one internal surface of said hollow body at least one coating composition in form of liquid dispersion comprising at least one glass frit and at least one polymeric dispersing agent, said agent being present in an amount such that said composition has a thixotropic index, as defined hereinafter, lower than 200 seconds;

(b) subjecting said internal surface comprising said coating composition to a thermal treatment, so as to obtain a vitrified coating layer.

The method according to the invention is based on the application of a coating composition in liquid form on the internal surface of a hollow glass body. The coating composition comprises at least one glass frit and at least one polymeric dispersing agent. Such composition, due to the subsequent thermal treatment, leads to the formation of a layer of glass coating, possibly coloured, which firmly adheres to the surface of the hollow body.

The coating method according to the present invention applies to the hollow glass bodies having at least one opening towards the external. Particularly preferred, are containers entirely made of glass or containers comprising at least one hollow glass body.

The method is applicable on common types of glass, such as soda-lime and borosilicate glasses. Particularly preferred are glasses suitable for resisting against the cooking of food products and at contact with substances at high temperature for food purposes.

The coating composition comprises at least one glass frit and at least one polymeric dispersing agent.

A glass frit is a mixed oxide or mixture of oxides. The frit may be prepared by subjecting one or more powder ingredients to melting. The molten product is thus cooled up to obtaining glass. The glass is then ground up to obtaining the glass frit. The melting temperature vary as a function of the chemical composition of the frit. Typically, the melting temperature is comprised in the range between about 750° C.-1400° C. Generally, the elements used for preparing the frit are in oxide or carbonate form.

According to the present invention, in the coating composition there may be present one or more glass frits, preferably in a quantity comprised in the range between 50-80% by weight with respect to the total weight of the coating composition, more preferably in the range between 55-70% by weight.

Preferably, the frit is of the silicate or borosilicate type. Preferably, the frit comprises one or more of the following elements in ion form: Si, Na, P, Ca, K, Ti, Zn, Ba, Bi, Pb and B.

More preferably, the frit comprises at least Si, Zn, B, Ca and Ba.

Preferably, the frit does not contain heavy metals (e.g. lead).

The concentration of elements different from oxygen in the frit may vary at large intervals. A preferred example of the frit has the chemical composition indicated below, where the concentration of the elements is expressed in terms of the corresponding oxide and the indicated percentages are percentages by weight referred to the overall weight of the frit:

| | |
|---|---|
| $SiO_2$ | 30-45%, |
| $Na_2O$ | 1-4%, |
| $P_2O_5$ | 0-1%, |
| CaO | 2-6%, |
| $K_2O$ | 2-6%, |
| $TiO_2$ | 4-9%, |
| ZnO | 8-18%, |
| BaO | 0-2%, |
| $Bi_2O_3$ | 2-6%, |
| $B_2O_3$ | 10-20%. |

The concentration of each of the aforementioned oxides shall be deemed independently variable from the concentration of the other oxides present in the frit.

The frit may be coloured. For this purpose, one or more pigments may be added during the preparation of the frit. The colouring may also be obtained by adding a precursor compound of the pigment to the mixture of compounds subjected to melting. Due to the melting treatment, the precursor is transformed into a pigment capable of colouring the frit. The pigments added to the frit produce translucent coloured vitreous coatings.

In order to obtain a coloured glass coating, one or more pigments may also be added in the coating composition separately from the frit. In this case, the coloured coating applied to the hollow glass is opaque.

Typically, the pigment is added to the coating composition in quantity such to have a concentration comprised in the range between 1-35% by weight, preferably 5-20% by weight, with respect to the total weight of the applied coating composition. The grain size of the pigment is preferably comprised in the range between 1-50 micrometres, more preferably in the range between 5-25 micrometres, even more preferably in the range between 2-8 micro-metres. The pigments with the smaller grain size shall be preferred in that they have a greater colouring capacity when used at low concentrations and, during vitrification, they lead to coatings with chemical and mechanical resistance much greater than the coatings of the prior art.

The coating composition according to the present invention may comprise one or more polymeric dispersing agents.

The polymeric dispersing agent mainly performs the task of carrying the frit and possibly the pigment (and the other possibly present additives) on the surface of the glass to be coated, thus guaranteeing an optimal dispersion thereof thereon.

In addition, the polymeric dispersing agent confers to the coating composition the required fluidity during the application together with the capacity of coagulating rapidly once applied on the glass.

The polymeric dispersing agent may be selected from among various types of resins.

In a first embodiment, said agent is a polycarboxilic thermoplastic resin, i.e. a resin obtained starting from monomers containing the carboxylic groups.

Particularly preferred resins are polyester resins, acrylic resins, amide resins and vinyl resins, of the type generally used for producing varnishing and coating compositions.

Preferably, the weighted average molecular weight of the aforementioned resins is in the range between 20000-100000 g/mols, preferably 25000-45000 g/mols.

Preferably, the polydispersity index is greater than 1.

An example of a resin that can be used for the purposes of the present invention is the resin available on the market under the commercial name of HYDROL® 77/131, produced by the company CHIMICOLOR INDUSTRIA CHIMICA S.r.l.

In a further preferred embodiment the at least one polymeric dispersing agent is selected from among the cellulose resins, more preferably from among cellulose ethers, cellulose esters and mixtures thereof.

Cellulose ethers and esters are derivatives of the cellulose obtained by partially or fully replacing the hydrogen atoms of the cellulose hydroxyl groups respectively with alkyl or acyl groups (organic esters).

Esters of the inorganic type may be obtained by replacing the aforementioned hydrogen atoms with nitro groups (—$NO_2$; nitrocellulose) and sulphur groups (—$SO_3H$; cellulose sulphate).

In the case of the cellulose ethers, preferred alkyl groups are: methyl, ethyl and propyl.

The alkyl groups also include the hydroxyalkyl groups (for example, hydroxymethyl, hydroxyethyl, hydroxymethylethyl, hydroxypropylmethyl) and carboxyalkyl.

In case of the cellulose esters, preferred acyl groups are: acetyl, propionyl, butyryl.

Preferably, the cellulose organic ethers and esters used for the present invention contain alkyl and acyl groups having between 1 and 4 carbon atoms ($C_1$-$C_4$).

The cellulose ethers may also contain different alkyl groups.

Cellulose ethers and esters may also be mixed ethers, i.e. polymers containing alkyl and acyl groups in various proportions.

Preferably, the weighted average molecular weight of the cellulose ethers and esters that can be used for the present invention is in the range between 70000-500000 (g/mols).

Preferably, the polydispersity index is greater than 1.

Preferably, the polymeric dispersing agent is substantially soluble in the carrier fluid of the coating composition.

The solubility of the cellulose ethers and esters in water or in an organic solvent depends at least partially on the degree of substitution, i.e. on the average number of substituting groups bound to each glucosidic ring (if all three hydrogen atoms of the available hydroxyl groups are exchanged, the degree of substitution is equivalent to 3; if the number of hydrogen atoms substituted on each glucosidic ring is averagely equivalent to 2, the degree of substitution is equivalent to 2; etc.).

Preferably, the cellulose ethers and esters have a degree of substitution in the range between 0.5-2.2, more preferably in the range between 1-2.

The cellulose ethers and esters may be prepared according to the synthesis methods known in the state of the art and they are available in the market.

The solid fraction of the coating composition is dispersed in a liquid carrier fluid. The liquid carrier fluid is preferably water. However, it is also possible to use the organic solvents, possibly in mixture, typically used in the paints industry.

The coating composition may also comprise common additives used for preparing paints and polishes, such as surfactants, dispersion stabilizers, bonding promoters, rheological modifiers, thixotropic modifiers, densifiers, diluents, etc.

The coating composition is prepared by mixing the components in the desired weighted ratios in water or any other liquid carrier fluid up to obtaining a homogeneous dispersion. Typically, the frit is added to a liquid dispersion of the resin together with the possible pigments and other additives. Generally, the mixing is carried out at room temperature.

Given that, after application, the coating composition is subjected to a thermal treatment at a temperature comprised in the range between 450-800° C. (vitrification treatment), it is important that the degree of dilation and the shrinking to which it is subjected during the heating and cooling steps be comparable with that of the glass on which it is applied. Thus, this actually also avoids tensions between the surfaces of the two materials which may lead to the occurrence of defects in the coating. For this purpose, the coating preferably has a coefficient of linear thermal dilation comprised in the range between $50$-$90 \cdot 10^{-7}$ $K^{-1}$, preferably $60$-$80 \cdot 10^{-7}$ $K^{-1}$, even more preferably $65$-$75 \cdot 10^{-7}$ $K^{-1}$, said interval corresponding to the range of linear thermal dilation of the glass more commonly used for the production of containers for packaging food products, cosmetic products etc. The coefficient of linear thermal dilation is measured on the solid sintered fraction of the coating composition according to the ISO 7991:1987 standard.

The coefficient of thermal dilation of the coating may be varied, for example, by modifying the concentration of the components used for preparing the frit or the concentrations of the frit and the possible pigments in the coating composition.

As better described hereinafter, the coating composition may be applied in form of liquid dispersion through spraying nozzles introduced into the hollow glass body. The spraying technique, combined with the use of a coating composition in liquid form, allows applying a coating even only on one portion of the internal surface of the hollow glass body.

For an efficient and accurate application by spraying, the viscosity of the applied composition is preferably comprised in the range between 1-50 Pa·s, preferably 2-40 Pa·s, preferably 5-30 Pa·s, more preferably 8-20 Pa·s. For the purposes of the present invention, the viscosity of the coating composition shall be deemed measured at 20° C. according to the DIN 53013 standard.

The density of the coating composition typically varies in the range between 1.5-2.5 kg/$dm^3$.

The surface tension of the coating composition preferably varies in the range between 10-100 mN/m.

In addition, from a rheological point of view it is important that the coating composition has a thixotropic behaviour so as to be easily sprayed and, simultaneously, be rapidly coagulated once applied on the surface to be coated. In particular, in order to avoid the occurrence of imperfections in the coating (e.g. dripping), the coating composition should have a viscosity such to be quickly distributed on the surface of application when, for example, the hollow body to be coated is kept rotating on itself. At the same time, upon the termination of the mechanical forces which operate on the coating composition deriving from the spraying pressure and the rotation of the glass body, the coating composition should be able to recover the initial viscosity (prior to the application) coagulating rapidly.

The thixotropic behaviour of a coating composition may be evaluated by measuring the trend of the viscosity value thereof over time. A reference index of the thixotropic behaviour of a coating composition, for example, is given by the period of time required so that the viscosity of a coating composition, that had been subjected to stirring under pre-established conditions, returns to have the initial viscosity upon termination of the stirring.

Preferably, the coating composition according to the present invention, if subjected to stirring at room temperature (20° C.) in a mechanical mixer (rotational speed of about 300 rpm; 1 liter sample) for 2 minutes, uses a period of time lesser than or equivalent to 60 seconds for recovering at least 50% of the viscosity lost due to the shear stress imparted by the mixing, i.e. for returning to a viscosity value equivalent to least 50% of the value calculated on the coating composition in absence of stirring (at the same measurement conditions). For the purpose of the present invention, this index is indicated as the "thixotropic index" of the coating composition.

Typically, the thixotropic index of the coating composition is lower than or equal to 200 seconds, preferably lower than or equal to 100 seconds, more preferably lower than or equal to 60 seconds. Preferably, the thixotropic index is greater than or equal to 10 seconds, more preferably greater than or equal to 30 seconds.

In addition, the coating composition has a viscosity greater than 10 Pa·s, measured with a Brookfield viscometer at 20° C. and at a rotation speed of 10 rpm, and a viscosity lower than 5 Pa·s, measured using the same instrument, at the same temperature and at a rotation speed of 100 rpm.

The viscosity of the coating composition to be applied and the thixotropic behaviour thereof may be selected as a function of the chemical characteristics of the glass to be coated and the geometric shape of the hollow body.

The thixotropic behaviour is affected by the amount of polymeric dispersing agent present in the composition, besides the amount of solids.

The polymeric dispersing agent is present in the coating composition at an amount comprised in the range 1-20% by weight with respect to the overall weight of the coating composition, preferably 5-15% by weight.

According to the method of the present invention, after the application of the coating composition, the surface covered by the latter is subjected to a vitrification thermal treatment. The thermal treatment is preferably carried out at a temperature comprised in the range between 450-800° C., more preferably 500-700° C. The treatment temperature is mainly selected as a function of the chemical composition of the coating used.

During the vitrification treatment the frit melts, adhering to the surface of the hollow glass body forming the glass coating layer. At the same time, the polymeric dispersing agent is decomposed thermally.

Given that a too rapid evaporation of the solvent could lead to defects in the coating (or even to the breakage of the glass), it is preferable to subject the coated glass body to a progressive heating up to reaching the temperature desired for the vitrification treatment. Preferably, the vitrification treatment is preceded by a step of drying the applied coating composition, which comprises the heating of the coated glass body at a temperature comprised in the range between 150-250° C. In this step, there is also facilitated the moving away of the volatile residues deriving from the carbonisation of the organic resin.

The duration of the drying and vitrification thermal treatment is selected as a function of the chemical composition of the coating composition and the applied quantity thereof. Typically, the duration of the drying treatment is preferably of about 15-30 minutes; the duration of the vitrification treatment is preferably of about 40 minutes.

In a first embodiment of the present invention, the glass coating may be directly applied on the internal surface of the hollow glass body.

In a second embodiment, the coating may be applied on one or more possible intermediate coatings (decorative or functional) previously applied on the internal surface of the hollow glass body.

The intermediate coatings may be vitreous coatings obtained using coating compositions according to the present invention or coatings obtained using conventional materials (in the latter case, applicable both in liquid state and solid state). The outermost glass coating, i.e. the one that may come to contact with the product, actually guarantees that there is no substantial migration towards the product of unwanted substances coming from the intermediate layers, regardless of the chemical composition of the latter.

In addition, in order to obtain particular aesthetic effects it is possible to apply, one on another, two or more glass coatings according to the present invention having different chemical composition (for example, coatings of different colour). In this case, after the application of each coating, a thermal vitrification treatment may be performed to form the corresponding glass coating.

Alternatively, the two or more layers of coating composition can be applied in succession, without performing intermediate vitrification treatments ("wet on wet" application), and performing a single final thermal vitrification treatment.

In addition, the particular chemical composition of the coating of the present invention is compatible with the application of further coatings, for example through the serigraphy technique commonly used in the decoration of the glass articles.

In particular, should there be required a particularly high mechanical resistance of the hollow glass body or in the case of coatings applied on a glass with scarcely stable chemical composition (i.e., with the tendency to the surface migration of metals) the coated glass can be subjected to chemical tempering processes.

The application of the coating composition on the internal surface of a hollow glass body may be carried out using the techniques known in the art both manually and in automated way.

The coating composition is preferably applied using the spraying technique. For such purpose, there can be used the spraying devices conventionally used in the painting industry (e.g. devices of the "air-mix" or "air-less" type). The spraying devices are provided with end nozzles with dimensions such to be able to be introduced into the hollow glass body and directed towards the surface intended to be coated.

Regarding this, it should be observed that the spraying of the coating composition, though producing a jet of minute drops into the hollow glass body, does not necessarily require the uncontrolled distribution of the composition in the entire available volume. Suitably adjusting the dispensed quantity of composition, the viscosity thereof and the dispensing pressure actually allows obtaining a directional spray, i.e. a spray capable of substantially involving only one limited portion of the internal surface of the hollow body.

In addition, should the spraying device and the hollow glass body be in movement with respect to each other during the spraying of the coating composition, it is possible to obtain shaded decorative effects or with irregular geometric shape. In addition, exploiting the mutual movement of the spraying device and the hollow glass body allows applying a uniform and continuous coating substantially over the entire internal surface of the hollow body. In particular, keeping the hollow glass body in rotation on itself during the application (the so-called, spin coating), allows obtaining a very homogeneous and localised distribution of the drops of sprayed coating composition.

The application of the coating composition may be carried out at room temperature, i.e. without pre-heating the coating composition or the glass surface to be coated.

In order to make the coating composition adhere more to the glass, it is possible to pre-heat the composition or the glass surface to be coated. The heating of the surface to be coated may be performed by placing the hollow glass body in a furnace or through direct flaming of the surface.

The method according to the present invention may be easily obtained at industrial level, using devices and equipment conventionally used in the glass containers production industry.

In addition, the method according to the present invention may be integrated within a line for the continuous production of hollow glass bodies (e.g. containers). In this case, the application of the coating composition may be performed, for example, hot application, i.e. after the step of forming the hollow glass bodies while the vitrification treatment may coincide with the annealing treatment.

The glass coating that can be obtained through the method according to the present invention may serve two purposes. In presence of pigments, the coating appears as a decorative layer—observable from the external (decorative function)—of the hollow glass body. The obtained effect is similar to that of the cased glass.

Both in presence or absence of pigments, the applied glass coating serves as a barrier with respect to the migration of unwanted substances—coming from the glass which forms the hollow body—towards the product contained therewithin or with respect to the substances coming from possible layers of intermediate coating located between the hollow glass body and the glass coating layer.

In addition, being of vitreous type, the coating according to the present invention substantially does not release substances towards the products with which it may come and remain in contact even for long periods of time. Due to the chemical characteristics, the coating applied using the method of the present invention is particularly resistant to the abrasion that may derive from rubbing using kitchen utensils.

The coating of the present invention is also capable of resisting to heat shock that may for example derive from contact with hot liquids (e.g. hot beverages). In addition, it is resistant to washing using alkali agents, both manual (possibly, even using abrasive instruments such as brushes and sponges) and in washing machines (dishwashers).

In a preferred embodiment, the method according to the present invention may be used for internally coating containers intended to receive liquid or solid contents, such as food, pharmaceutical or cosmetic products, in particular liquids containing alcohol compounds, such as body perfumes and alcoholic drinks.

The following embodiment is provided purely by way of illustration of the present invention and thus shall not be deemed limiting to the field of protection defined by the attached claims.

EXAMPLE 1

There was prepared a coating composition according to the present invention having the following chemical composition (percentages by weight referred to the overall weight of the coating composition):

| | |
|---|---|
| glass frit (borosilicate) | 65% |
| pigment (CuO) | 15% |
| polycarboxylic resin | 10% |
| water | 10%. |

The aforementioned components were mixed at room temperature up to obtaining a homogeneous coating composition with viscosity of about 6 Pa·s (DIN 53013) corresponding to about 120 seconds DIN4 cup according to the UNI EN ISO 2431 standard. The coefficient of linear thermal dilation of the coating composition is equivalent to $72 \cdot 10^{-7}$ $K^{-1}$ (ISO 7991:1987 standard).

The thixotropic index of the coating composition was equivalent to 44 seconds.

The composition was applied on the internal surface of a set of 30 bottles (with volume equivalent to 50 or 100 ml) made of soda lime both on the bottom and on the lateral walls through a spraying nozzle.

The coated bottles were subjected to a thermal treatment at the temperature of about 600° C. for 40 min.

For comparison purposes, the coatings obtained through the method of the present invention were compared with other glass bottles or containers having an inner coating applied using the method according to the prior art, as indicated in Table 1.

The bottles coated with the method according to the present invention and the comparison items were subjected to a test for evaluating the mechanical and heat resistance of the coating, as well as the suitability to contact with food products and to prolonged contact with potentially aggressive substances. The results of the test are indicated in Table 1.

TABLE 1

| COATING COMPOSITION | MECHANICAL RESISTANCE ISO 2409 | TOTAL MIGRATION DM 21/03/1973 (Autoclave test at 121° C., 1 bar) | CHEMICAL RESISTANCE IMMERSION G1 (24 h, Room temp.) | WASHING DISHWASHER RESISTANCE EN 12875-2 | HEAT SHOCK UNI EN 1183 ($\Delta T = 50°$ C.) |
|---|---|---|---|---|---|
| Glass flint (not coated) | High resistance; classification: 0 | Transfers = 1.85 mg/dm$^2$ | Resistance to nail abrasion: >100 times | 1500 washing cycles: occurrence of visible aesthetic damaging marks | Breakage = 0% |
| Based on organic resins (liquid) | Insufficient resistance; classification: 3-4 | Total detachment of the coating from the glass | No aesthetic alteration. Resistance to nail abrasion = 0 times | 1-5 washing cycles: total loss of adhesion of the coating | Breakage = 0% |
| Based on organic | Insufficient resistance. | Total detachment of | No aesthetic alteration | 5-10 washing cycles: | Breakage = 0% |

TABLE 1-continued

| COATING COMPOSITION | MECHANICAL RESISTANCE ISO 2409 | TOTAL MIGRATION DM 21/03/1973 (Autoclave test at 121° C., 1 bar) | CHEMICAL RESISTANCE IMMERSION G1 (24 h, Room temp.) | WASHING DISHWASHER RESISTANCE EN 12875-2 | HEAT SHOCK UNI EN 1183 ($\Delta T = 50°$ C.) |
|---|---|---|---|---|---|
| resins (powder) | classification: 3-4 | the coating from the glass | Resistance to nail abrasion = 0 times | loss of adhesion of the coating with partial decolouration | |
| sol-gel | Good resistance; classification: 0-1 | Total detachment of the coating from the glass | No aesthetic alteration. Resistance to nail abrasion = 20-50 times | 5-10 washing cycles: loss of adhesion of the coating with partial decolouration | Breakage = 10% |
| Powder polish | High resistance; classification: 0 | No aesthetic damage; transfers = 20.0-50.0 mg/dm$^2$ Caused by incomplete vitrification | No aesthetic alteration. Resistance to nail abrasion = 70-80 times | 100 washing cycles: breakage due to heat and mechanical stresses. Surface decolouration | Breakage = 100% |
| Cased or manual glass (glass on glass) | High resistance; classification: 0 | No aesthetic damage; transfers = 8-10 mg/dm$^2$ | Resistance to nail abrasion >100 times | 100 washing cycles: occurrence of defects, such as very visible marks | Breakage = 0% |
| present invention | High resistance; classification 0 | No aesthetic damage; transfers = 0.5-5.0 mg/dm$^2$ (variability due to the concentration of pigments) | No aesthetic alteration After immersion. Resistance to nail abrasion >100 times | 500 washing cycles: initial fading of the outermost layer of the coating | Breakage = 0% |

The tests show the high performance of the coating obtained according to the present invention. In particular, the experimental results show how, besides being easy to obtain, this coating is suitable to be used for the decoration and/or for the protective coating of hollow glass bodies intended to be used in various fields.

EXAMPLE 2

A second coating composition according to the present invention was prepared having the following chemical composition (percentages by weight referred to the overall weight of the coating composition):

| | |
|---|---|
| glass frit (borosilicate) | 65% |
| pigment (TiO$_2$) | 15% |
| cellulose ester | 10% |
| water | 10%. |

The aforementioned components were mixed at room temperature until a homogeneous coating composition with viscosity of about 14 Pa·s (DIN 53013) is obtained. The thixotropic index of the coating composition was of 36 seconds.

The second coating composition was applied on a set of glass bottles according to the description of example 1, obtaining final coatings having the same performance in terms of mechanical and heat resistance, as well as suitability to contact with food products and prolonged contact with potentially aggressive substances of the coated bottles of example 1.

The invention claimed is:

1. Method for internally coating a hollow glass body comprising, in the following order:
   (a) applying by a spraying device, onto at least an internal surface of said hollow body, at least one coating composition, to obtain a coated glass body, wherein the coating composition is in the form of aqueous dispersion comprising at least one glass frit and at least one polymeric dispersing agent, said agent being present in such an amount that said composition has a thixotropic index lower than 200 second; said hollow body and said spraying device being in movement with respect to each other, said movement comprising keeping said hollow body rotating on itself during the application of said coating composition; and
   (b) subjecting said internal surface comprising said coating composition to a thermal treatment at a temperature in the range of 450-800° C., so as to obtain a vitrified coating layer,
   wherein said frit is present in the composition in a quantity comprised in the range 50-80% by weight with respect to the weight of the coating composition,
   wherein said polymeric dispersing agent is present in the composition in a quantity comprised in the range 1-20% by weight with respect to the weight of the liquid phase of said dispersion, and
   wherein said frit comprises, based on a total weight of said frit:
   SiO$_2$ 30-45%;
   Na$_2$O 1-4%;

P$_2$O$_5$ 0-1%;
CaO 2-6%;
K$_2$O 2-6%;
TiO$_2$ 4-9%;
ZnO 8-18%;
BaO 0-2%;
Bi$_2$O$_3$ 2-6%; and
B$_2$O$_3$ 10-20%.

2. Method according to claim 1, wherein said at least one dispersing agent is a polycarboxylic thermoplastic resin.

3. Method according to claim 1, wherein said at least one dispersing agent is selected from among: a polyester resin, an acrylic resin, an amide resin and a vinyl resin.

4. Method according to claim 1 wherein said at least one dispersing agent is a cellulose resin.

5. Method according to claim 1, wherein said thixotropic index is lower than or equal to 100 seconds.

6. Method according to claim 1, wherein said thixotropic index is greater than or equal to 10 seconds.

7. Method according to claim 1, wherein said frit comprises at least one pigment.

8. Method according to claim 1, wherein said coating composition comprises at least one pigment dispersed in the liquid phase of said dispersion.

9. Method according to claim 1, wherein said coating composition has a linear thermal expansion coefficient (measured on the solid fraction) in the range 50-90·10$^{-7}$ K$^{-1}$.

10. Method according to claim 1, wherein said coating composition has a viscosity in the range 1-50 Pa·s.

11. Method according to claim 4, wherein said cellulose resin is a cellulose ether, a cellulose ester, or a mixture thereof.

12. Method according to claim 11, wherein said cellulose ether or ester has a degree of substitution in the range between 1-2.

13. Method according to claim 11, wherein said cellulose either or ester has a degree of substitution in the range between 0.5-2.2.

14. Method according to claim 1, wherein said thixotropic index is lower than or equal to 60 seconds.

15. Method according to claim 1, wherein said thixotropic index is greater than or equal to 30 seconds.

16. Method according to claim 1, wherein said coating composition has a linear thermal expansion coefficient (measured on the solid fraction) in the range 60-80·10$^{-7}$ K$^{-1}$.

17. Method according to claim 1, wherein said coating composition has a linear thermal expansion coefficient (measured on the solid fraction) in the range 65-75·10$^{-7}$ K$^{-1}$.

18. Method according to claim 1, wherein said coating composition has a viscosity in the range 5-30 Pa·s.

19. Method according to claim 1, wherein said coating composition has a viscosity in the range 8-20 Pa·s.

20. Method according to claim 1, wherein said frit is present in the composition in a quantity comprised in the range 55-70% by weight with respect to the weight of the coating composition.

21. Method according to claim 1, wherein said polymeric dispersing agent is present in the composition in a quantity comprised in the range 5-15% by weight with respect to the weight of the liquid phase of said dispersion.

22. Method according to claim 1, wherein said thermal treatment is carried out at a temperature in the range of 500-700° C.

* * * * *